H. E. ELLISON.
HAY RAKE AND LOADER.
APPLICATION FILED MAY 5, 1911.

1,016,740.

Patented Feb. 6, 1912.

3 SHEETS—SHEET 1.

Witnesses

Inventor
Henry E. Ellison
By Victor J. Evans
Attorney

H. E. ELLISON.
HAY RAKE AND LOADER.
APPLICATION FILED MAY 5, 1911.

1,016,740.

Patented Feb. 6, 1912.
3 SHEETS—SHEET 2.

Witnesses
Geo. Ackman Jr
Wm Bagger

Inventor
Henry E. Ellison
By Victor J. Evans
Attorney

H. E. ELLISON.
HAY RAKE AND LOADER.
APPLICATION FILED MAY 5, 1911.
1,016,740.
Patented Feb. 6, 1912.
3 SHEETS—SHEET 3.
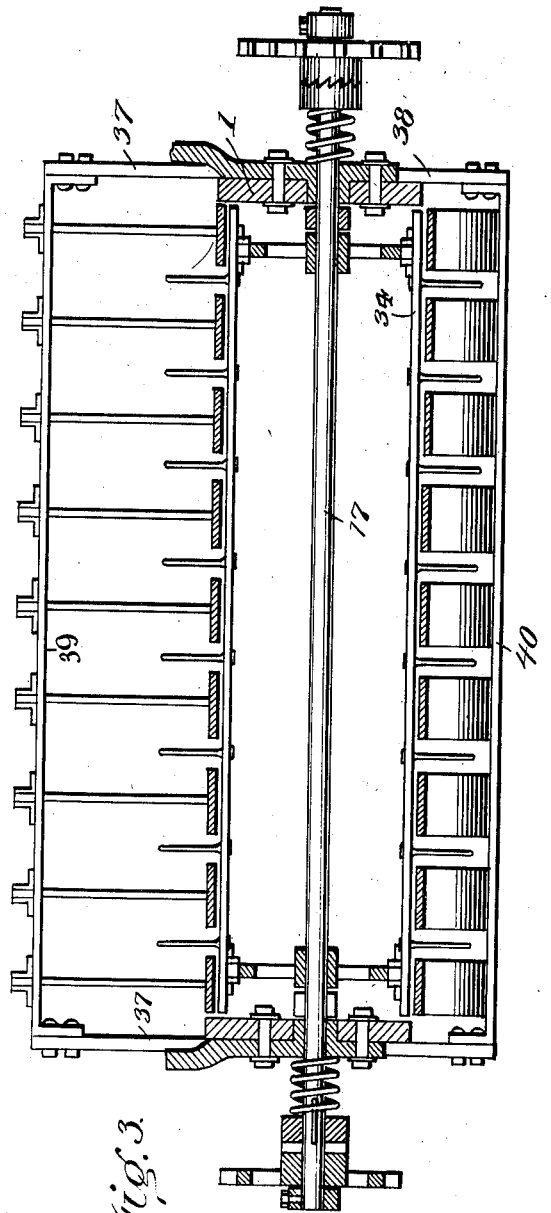
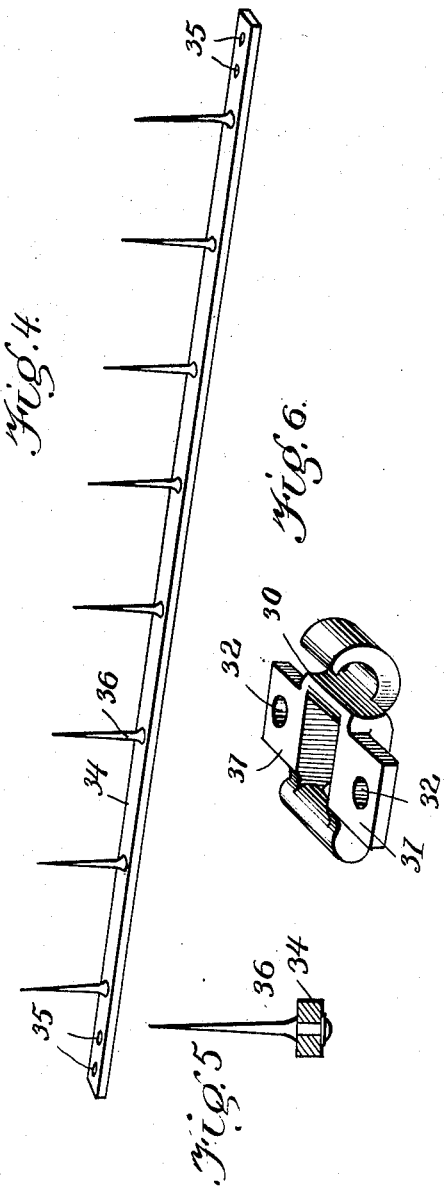
Inventor
Henry E. Ellison
Witnesses
By Victor J. Evans
Attorney

UNITED STATES PATENT OFFICE.

HENRY E. ELLISON, OF GIRARD, ILLINOIS, ASSIGNOR OF ONE-HALF TO ROSS M. ELLISON, OF ROCKBRIDGE, ILLINOIS.

HAY RAKE AND LOADER.

1,016,740.      Specification of Letters Patent.      Patented Feb. 6, 1912.

Application filed May 5, 1911. Serial No. 625,176.

*To all whom it may concern:*

Be it known that I, HENRY E. ELLISON, a citizen of the United States, residing at Girard, in the county of Macoupin and State of Illinois, have invented new and useful Improvements in Hay Rakes and Loaders, of which the following is a specification.

This invention relates to hay rakes and loaders, and the principal object of the invention is to produce a loading device of simple and improved construction which may be conveniently attached to and used in connection with an ordinary hay rake for the purpose of loading the hay gathered by the rake on to a wagon with which the device is connected.

A further object of the invention is to produce a simple and improved loading attachment for hay rakes which will admit of relative adjustment of the rake head and the loading apparatus so as to enable the work of raking and loading to be efficiently performed.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

Figure 1:
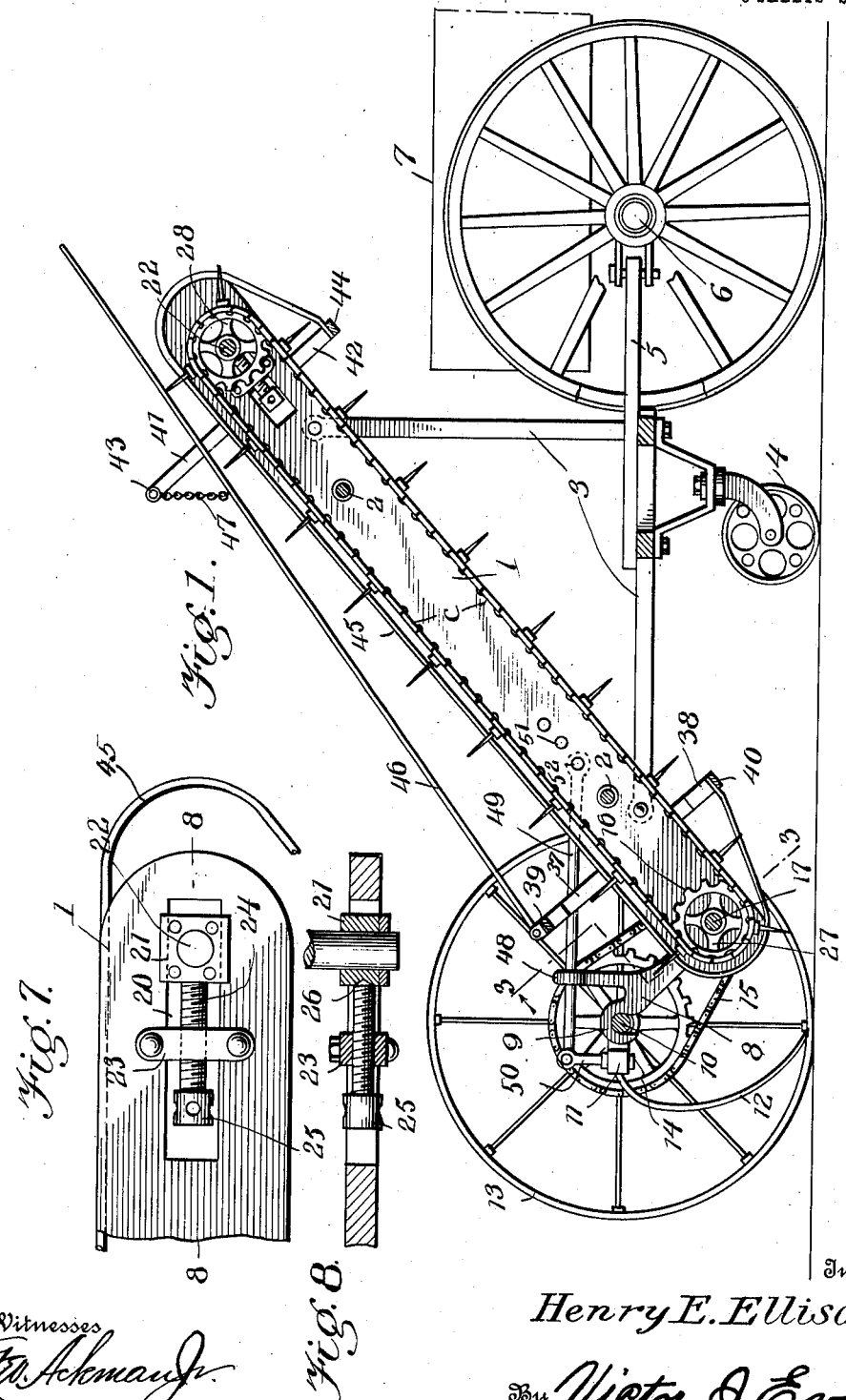
Figure 2:
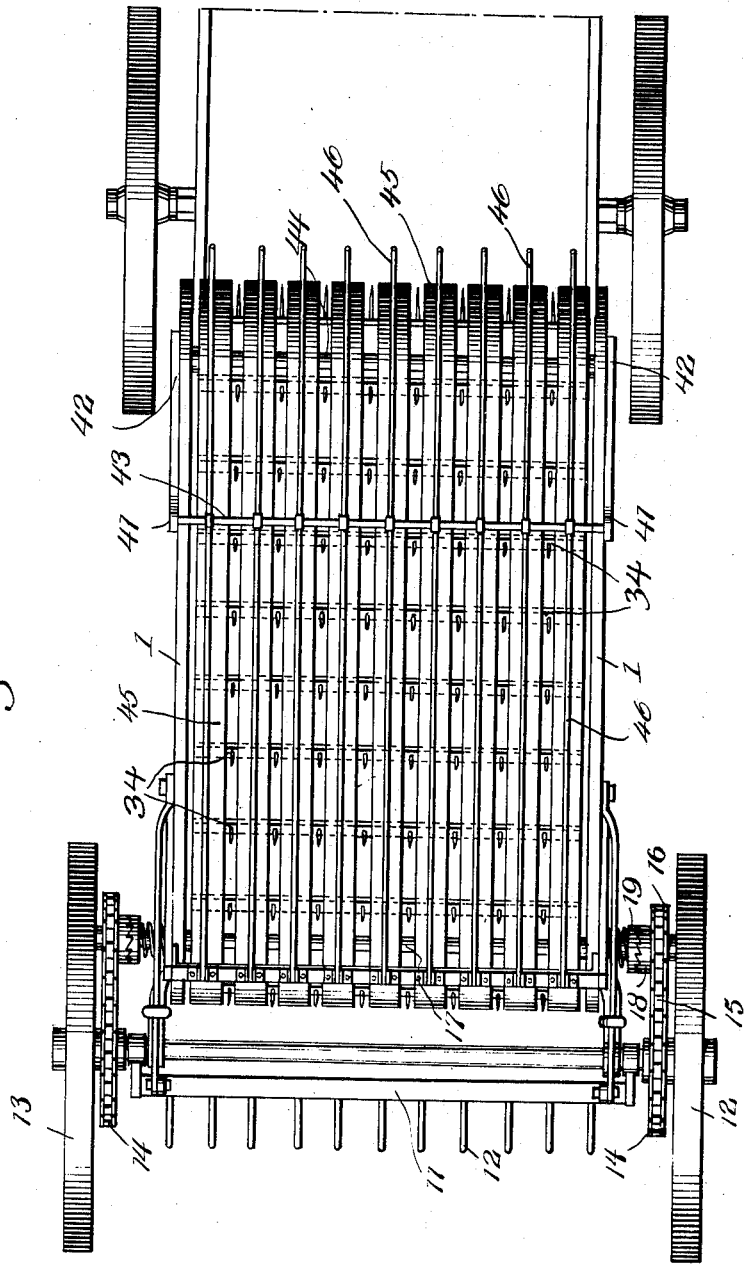

In the drawings,—Figure 1 is a sectional side elevation showing the improved loading attachment, together with a hay rake, the same being applied in operative position with reference to a wagon. Fig. 2 is a top plan view of the same. Fig. 3 is a transverse sectional view, enlarged, taken on the plane indicated by the line 3—3 in Fig. 1. Fig. 4 is a perspective detail view of one of the carrier slats of the loader. Fig. 5 is a transverse sectional view of the same. Fig. 6 is a perspective detail view of one of the chain links of the carrier. Fig. 7 is a detail side elevation, enlarged, of the upper end of the loader frame illustrating the tensioning device for the carrier. Fig. 8 is a sectional detail view taken on the line 8—8 in Fig. 7.

Corresponding parts in the several figures are denoted by like characters of reference.

The loader frame includes side members 1, 1 which are connected together and spaced apart by cross bars or rods 2, 2, said frame being supported in an inclined position upon a supporting frame 3 having rotary supporting means, such as a caster wheel 4 and equipped with a forwardly extending draft member 5 which is capable of being connected with the rear axle 6 of an ordinary hay wagon, a portion of which appears at 7.

The side members 1 of the loader frame are provided adjacent to their lower rear ends with bracket members 8 having hooks 9 adapted to be supported upon the axle 10 of an ordinary hay rake of which 11 represents the head having teeth 12. The rake wheels 13 are equipped with sprocket wheels 14 which are connected by chains 15 with sprocket wheels 16 upon a shaft 17 which is supported for rotation upon the side members 1 of the loader frame, near the lower end of the latter. The sprocket wheels 16, which are loosely mounted upon the shaft 17, are equipped with clutch members 18 engaging spring actuated clutch members 19 upon the shaft 17, which latter will thus be actuated in the proper direction when the rake is moved forwardly, while rearward motion of the rake will result in the shaft 17 remaining idle. This arrangement will also facilitate the turning of the machine, as will be readily understood. The side members 1 of the loader frame are provided adjacent to their upper ends with longitudinal slots 20, supporting slides 21, as best seen in Figs. 7 and 8, said slides affording bearings for a transverse shaft 22. Each of the slots 20 is spanned by a cross bar 23 constituting a nut through which operates a tightening screw 24 having a head 25 whereby it may be turned and a point 26 engaging the shaft carrying box or slide 21.

The shafts 17 and 22 are equipped with chain wheels 27 and 28 supporting the carrier C, see Fig. 1, which is composed of endless chains 29 including links 30 of the special construction illustrated in Fig. 6, by reference to which it will be seen that said special links are provided with laterally extending lugs or offsets 31 having perforations 32 for the passage of fastening members whereby the slats 34 are secured in position, said slats being provided with apertures 35 for the passage of fastening members and with teeth 36.

It will be seen that by means of the screws 24 the shaft carrying slides or boxes 21 may be adjusted, so as to place the carrier under the proper degree of tension to operate in the most efficient manner, it being also possible by this construction to take up slack occasioned by wear.

The loader frame is provided adjacent to its lower end with cross bars suitably secured upon the side members thereof and forming upwardly extending brackets 37 and downwardly extending brackets 38, the upwardly extending brackets 37 being connected by a cross bar 39 and the downwardly extending brackets being connected by a cross bar 40, as best seen in Figs. 1 and 3. In like manner, the loader frame is provided near its upper end with upwardly extending brackets 41 and with downwardly extending brackets 42, the brackets 41 being connected by a cross bar 43 and the brackets 42 being connected by a cross bar 44, as will be best understood by reference to Figs. 1 and 2.

Floor bars 45, which may consist of thin flexible strips of tough wood, sheet metal or the like, are provided to extend longitudinally of the loader frame above and adjacent to the upper lead of the carrier, said floor bars being terminally curved around the loader frame at the upper and lower ends of the latter, as clearly seen in Fig. 1, and said bars being terminally attached to the cross bars 40 and 44 below the lower lead of the carrier, and suitably spaced therefrom so as not to interfere with the operation thereof.

Hingedly connected with the cross bar 39, above the floor bars 45 are guard bars 46 which extend upwardly and forwardly over and beyond the loader frame, the free ends of said guard bars being connected with the cross bar 43 by flexible connecting means, such as chains 47, whereby they are sustained in operative position. These guard bars will serve to retain the load that is carried upward over the loader frame and to prevent the same from being scattered by the wind or from other causes, the guard bars resting upon such load by gravity and being capable of rising freely and independently of each other to compensate for the varying bulkiness of the load that is being carried over the loader frame by the carrier.

The bracket members 8, which serve to connect the loader frame with the axle of the hay rake, are provided with upwardly extending guide members 48 having eyes or apertures through which connecting rods 49 are guided, said connecting rods being connected at their rear ends with the arms 50 extending upwardly from the rake head, while the front ends of said connecting rods are adjustable with the side members 1 of the loader frame, said side members being provided with apertures 51 for the passage of the fastening member 52. It is obvious that the eyes or apertures in the guide members 48 are to be of sufficient area to enable the connecting rods 49 to move freely therethrough for the purpose of effecting the desired adjustment. It will be understood that by shifting the point of attachment of the connecting rods 49 with reference to the loader frame, the rake head will be slightly tilted to elevate the rake teeth. Proper adjustment may thus be had to enable the work to be most satisfactorily performed according to such conditions as may exist.

From the foregoing description, taken in connection with the drawings hereto annexed, the operation and advantages of this invention will be readily understood by those skilled in the art to which it appertains.

A loader attachment constructed as herein described may be manufactured and marketed at a very moderate expense, and such loader attachment may be conveniently applied to and used in connection with a hay rake and wagon of ordinary construction.

It is obvious that when the parts are properly assembled, as indicated in Fig. 1, and the combined machine is drawn over the field, the hay will be gathered by the rake and will be conveyed by the carrier in an upward and forward direction beneath the guard bars, being eventually dumped or discharged upon the hay wagon.

The construction is simple and inexpensive, and the device has been found to be thoroughly efficient for the purpose for which it is provided.

Having thus described the invention, what is claimed as new, is:—

1. In a loading attachment for hay rakes, a loader frame, an endless carrier on said frame, brackets associated with the loader frame and having hooks to engage the axle of the hay rake, guide members extending from the brackets, and connecting rods guided through said guide members, said connecting rods being adjustably connected at their front ends with the loader frame and adapted to be connected at their rear ends with the head of a hay rake.

2. The combination with a hay rake having a wheel carrying axle and a tooth carrying tilting head provided with upwardly extending arms, of a loader attachment comprising a frame having brackets provided with axle engaging hooks and upwardly extending guides, connecting rods guided through said guides and connected at their rear ends with the upwardly extending arms of the rake head, and means for connecting the forward ends of said rods adjustably with the loader frame.

3. In a loading attachment for hay rakes, an inclined loader frame comprising side members suitably connected and spaced apart, shafts supported for rotation adjacent to the upper and lower ends of the frame, an endless carrier guided over said shafts, bracket members extending downwardly from the sides of the loader frame adjacent to the upper and lower ends of said frame, cross bars connecting said brackets, and floor members extending longitudinally of the loader frame above and adjacent to the upper lead of the carrier, said floor members being terminally curved around the ends of the loader frame and attached to the cross bars connecting the downwardly extending brackets.

4. In a loader attachment for hay rakes, an inclined loader frame, an endless carrier on said frame, floor members extending longitudinally above and adjacent to the upper lead of the carrier, said floor members being terminally curved around the lower and upper ends of the frame, suitably supported cross bars to which the floor members are terminally attached, guard bars hingedly supported above and adjacent to the lower end of the loader frame above the floor bars, said guard bars having free ends gravitating in the direction of the upper ends of the floor members, and flexible means to support the free ends of the guard bars.

In testimony whereof I affix my signature in presence of two witnesses.

HENRY E. ELLISON.

Witnesses:
DALE A. WOOLLEY,
W. H. BRAUN.